United States Patent
Sugimori et al.

(10) Patent No.: US 7,135,441 B2
(45) Date of Patent: Nov. 14, 2006

(54) LUBRICATING GREASE COMPOSITION AND ROLLING APPARATUS

(75) Inventors: Youichiro Sugimori, Kanagawa (JP); Atsushi Yokouchi, Kanagawa (JP); Hisao Sumiya, Kanagawa (JP); Michiharu Naka, Kanagawa (JP)

(73) Assignee: NSK Ltd., Tokyo (JP)

( * ) Notice: Subject to any disclaimer, the term of this patent is extended or adjusted under 35 U.S.C. 154(b) by 16 days.

(21) Appl. No.: 09/985,093

(22) Filed: Nov. 1, 2001

(65) Prior Publication Data

US 2002/0142920 A1 Oct. 3, 2002

(30) Foreign Application Priority Data

Nov. 6, 2000 (JP) ............................. P.2000-337711
Oct. 26, 2001 (JP) ............................. P.2001-328850

(51) Int. Cl.
*C10M 111/00* (2006.01)
*C10M 169/02* (2006.01)
*C10M 171/06* (2006.01)

(52) U.S. Cl. ............... 508/485; 508/496; 508/499; 508/519; 508/520; 508/521; 508/539; 508/579; 508/581; 508/591

(58) Field of Classification Search ............... 508/485, 508/539
See application file for complete search history.

(56) References Cited

U.S. PATENT DOCUMENTS 4,410,435 A * 10/1983 Naka et al. ............... 252/42.1
4,859,352 A * 8/1989 Waynick ................... 252/41
4,879,054 A * 11/1989 Waynick ................... 252/41
5,059,336 A * 10/1991 Naka et al. ............... 252/33.3
5,385,412 A * 1/1995 Yatabe et al. ............. 384/492
5,707,944 A * 1/1998 Yokouchi et al. .......... 508/485
5,714,444 A * 2/1998 Yokouchi et al. .......... 508/539
5,840,666 A * 11/1998 Yokouchi et al. .......... 508/107
5,854,185 A * 12/1998 Roth et al. ................ 508/492
6,020,290 A * 2/2000 Takata et al. ............. 508/364
6,063,740 A * 5/2000 Kinoshita et al. .......... 508/364
6,407,043 B1 * 6/2002 Moehr ..................... 508/158
6,417,143 B1 * 7/2002 Mikami et al. ............ 508/465
6,432,888 B1 * 8/2002 Komiya et al. ............ 508/364
6,482,780 B1  11/2002 Yokouchi et al.

FOREIGN PATENT DOCUMENTS

CN     1338505 A    6/2002
JP    2000-328087 A  11/2000

* cited by examiner

*Primary Examiner*—Ellen M McAvoy
(74) *Attorney, Agent, or Firm*—Sughrue Mion, PLLC

(57) ABSTRACT

A grease composition is disclosed, wherein a metallic soap-base thickener containing a long-fiber material having a major axis part length of at least 3 μm is blended with a base oil obtained by mixing a lubricating oil having a polar group within the molecule structure and a non-polar lubricating oil, which can improve the initial sound (cage sound) of bearing at the starting of operation in a low-temperature environment and is effective on the reduction of fretting damage (abrasion) or torque, and also a rolling bearing and a linear acting apparatus each obtained by packing the grease composition are disclosed, which exhibit excellent low-temperature acoustic property and are reduced in the fretting damage (abrasion) or torque.

5 Claims, 7 Drawing Sheets

[FIG. 1]
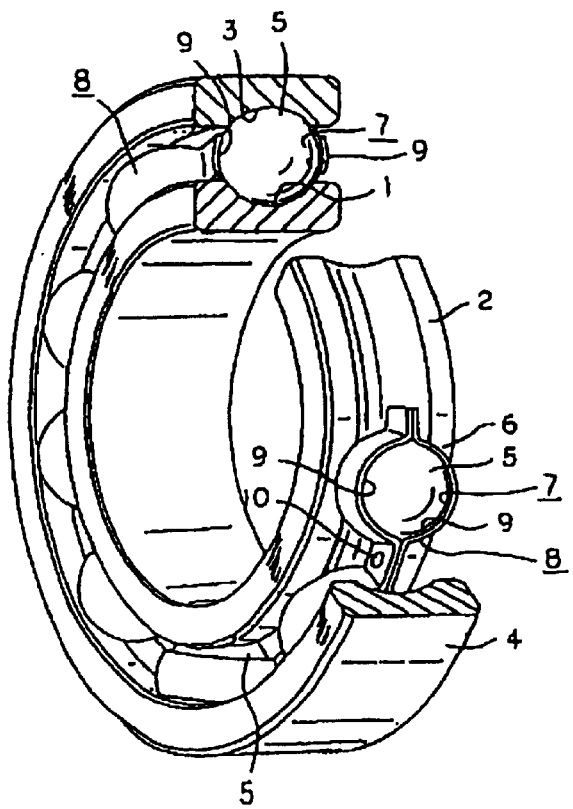
[FIG. 2]
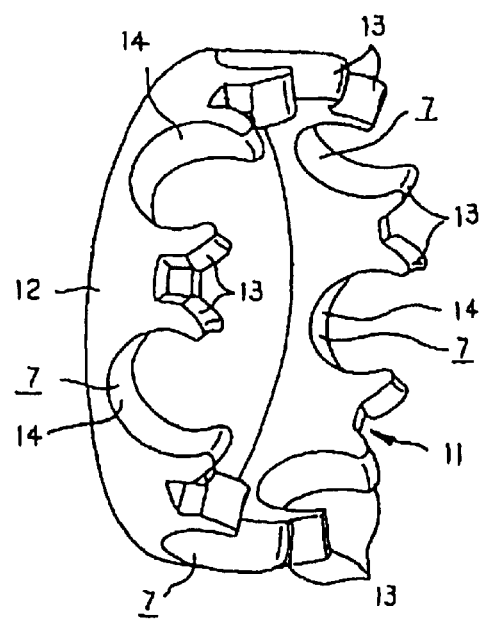

[FIG. 3]
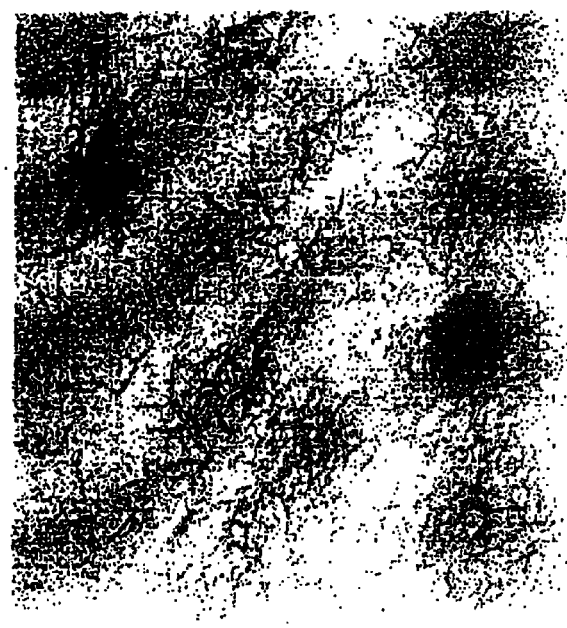
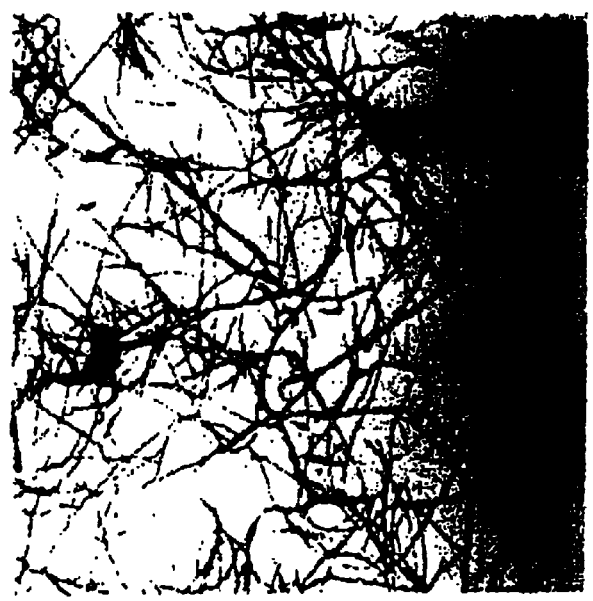
(A)  (B)  1 μm  Magnification of 6,000 times

[FIG. 4]
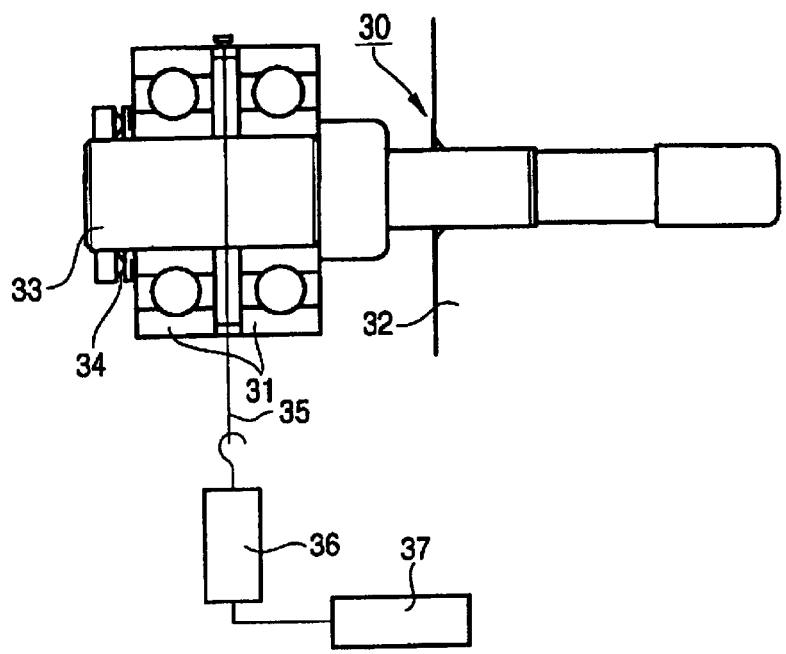
[FIG. 5]
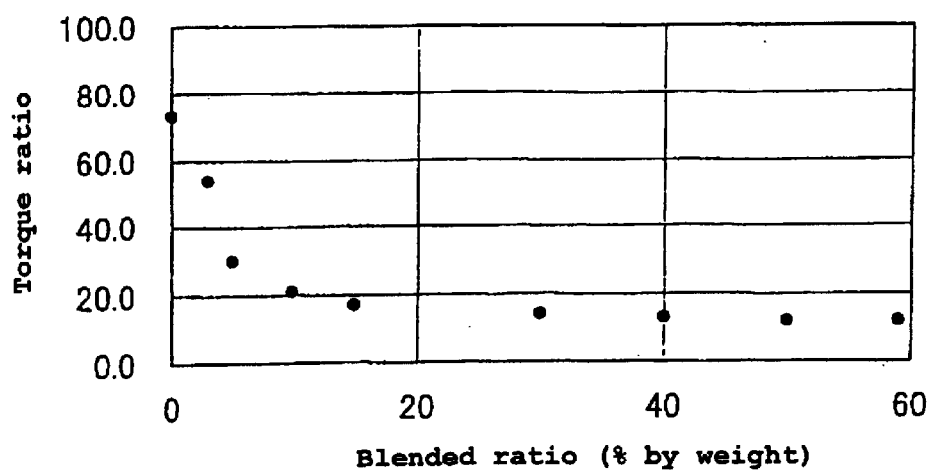

[FIG. 6]
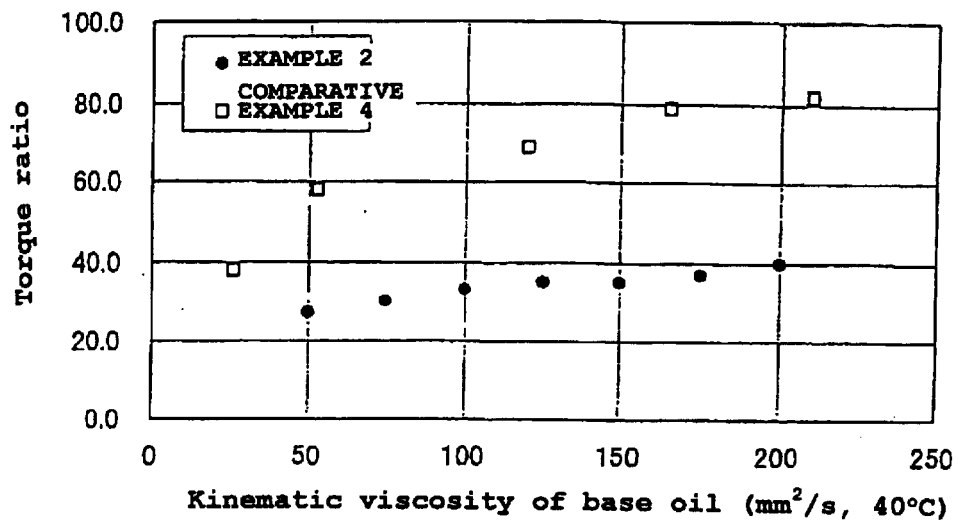
[FIG. 7]
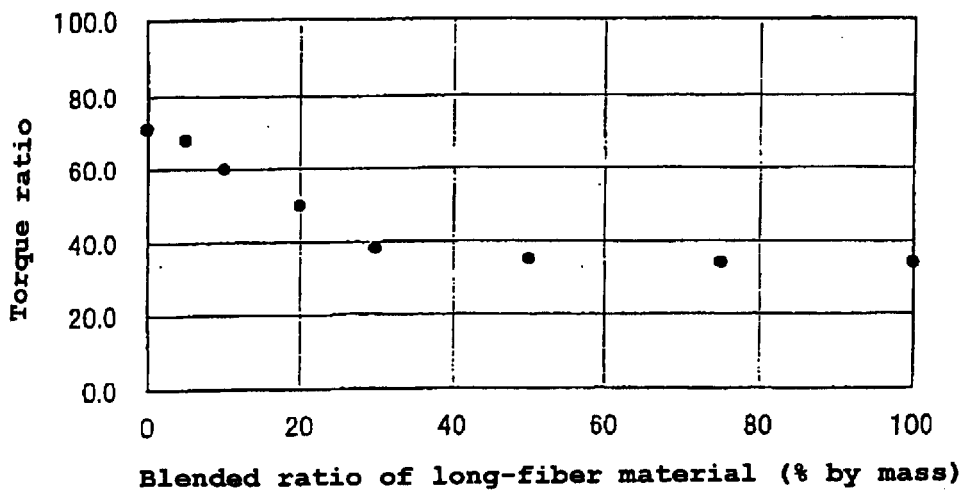

[FIG. 8]
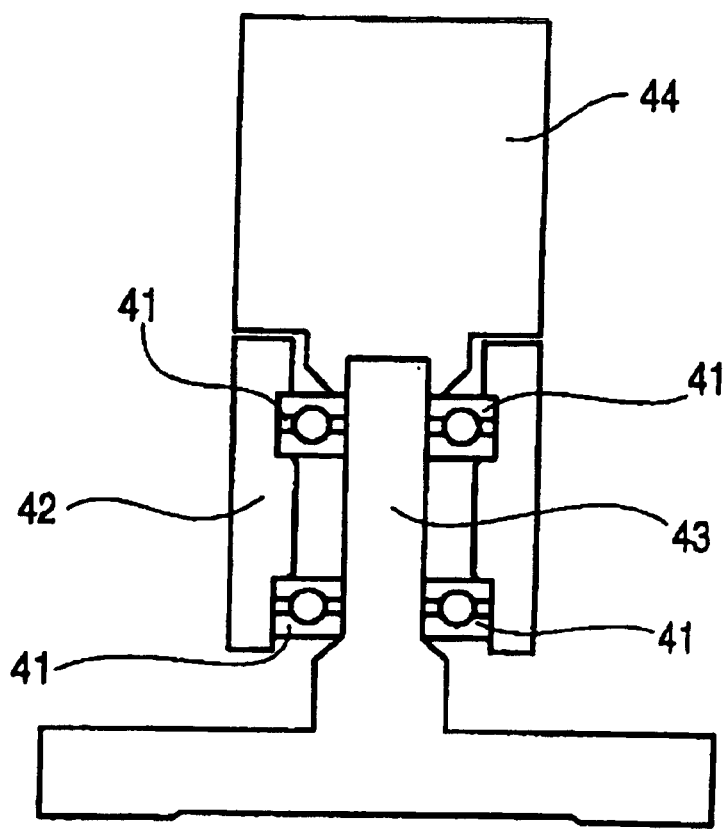

A : BALL SCREW APPARATUS AS TEST OBJECT
B : SPINDLE

C : LOAD DETECTOR

LUBRICATING GREASE COMPOSITION AND ROLLING APPARATUS

FIELD OF THE INVENTION

The present invention relates to a rolling bearing for various motors used in general industry, a linear acting apparatus such as linear guide apparatus and ball screw apparatus, and a grease composition packed in these rolling apparatuses, more specifically, the present invention relates to techniques for attaining improvement in the cage sound at low-temperature environment and reduction of the fretting damage (abrasion) and the bearing torque.

BACKGROUND OF THE INVENTION

As for the use in general industry, for example, a driving motor apparatus for air conditioning apparatuses (hereinafter referred to as an "air conditioner") is known. With the progress of air conditioners for higher performance and greater multifunction in recent years, the air conditioning is performed under the control of, for example, an inverter such that after the rapid cooling by a high-speed operation to lower the room temperature within a short time, the temperature of the room is kept constant by a low-speed operation. Accompanying this, a low-noise operation is demanded at the time of low-speed operation while suppressing the air blowing out sound, motor rotating sound and the like. However, the cooling efficiency inside the apparatus decreases at the low-speed operation and the temperature of rolling bearing installed into the motor sometimes rises even to around 100 to 120° C. Furthermore, the oil film thickness to be ensured by the lubrication can be hardly attained and the grease packed in the bearing is readily deteriorated. If the deterioration proceeds, noise is generated.

The outdoor unit used for air conditioners causes a bearing initial sound (cage sound) at the starting of operation in a low-temperature environment such as winter season and this becomes a problem in some cases.

Furthermore, a motor apparatus used for air conditioners is sometimes transported a long distance from a manufacturer of the motor to an end user by a truck while laying a rolling bearing in the state of being installed into the motor apparatus. In such transportation, the truck reflects fine irregularities on the road and this is transmitted to the rolling bearing as an impact load repeatedly added. As a result, the rolling element of the rolling bearing is repeatedly put into microscopic contact with the raceway surface to cause fretting damage (abrasion) on the raceway surface and this sometimes generates noises.

On the other hand, by taking account of the environmental regulation at the same time with the above-described higher performance and greater multifunction, studies are being made to accelerate the downsizing and the low outputting and thereby suppress the heat generation from motors. To satisfy this, the rolling bearing for these uses is demanded to have low torque properties as an important function. The dynamical friction torque of the rolling bearing is caused by the friction resulting from microscopic sliding on the rolling contact surface, the sliding friction at the sliding contact part within the bearing, and the viscous resistance of grease. Among these causes, the viscous resistance of grease is known to be under the effect of the kinematic viscosity of base oil and the penetration of grease. The kinematic viscosity of base oil is dependent on the oil shearing resistance when a fluid lubricating film is formed. Therefore, the reduction in this kinematic viscosity takes an important role in attaining the reduction in dynamical friction torque of the rolling bearing. The penetration of grease is related with the channeling property when the grease in the bearing is subjected to shearing at the rotation of the bearing. Therefore, the reduction of this penetration is also effective.

However, the motor of air conditioners is sometimes operated at a relatively low speed under the control of inverter as described above, therefore, if the kinematic viscosity of base oil is reduced, the oil film thickness can be hardly ensured. In addition, oils having low kinematic viscosity are generally low in the heat resistance and therefore, suffers from a problem in the acoustic durability. On the other hand, since the reduction of grease penetration incurs increase in the amount of thickener blended, the amount of base oil in the grease is relatively reduced and the resistance of grease against mechanical shearing is elevated, as a result, the amount of base oil supplied to the bearing lubricating surface is decreased and the lubricity cannot be stably maintained for a long period of time.

As such, reduction in the kinematic viscosity of base oil and reduction in penetration of grease are limited and in the case of a rolling bearing for the above-described uses, a grease such that the kinematic viscosity of base oil at 40° C. is from 10 to 500 mm$^2$/s, the penetration of grease is NLGI No. 2 to No. 3 grade or the amount of thickener blended is from 5 to 20% by mass, is considered suitable. For motors required to satisfy particularly the low noise property, namely, the acoustic durability, a grease comprising an ester base oil having blended therewith a fatty acid lithium salt as a thickener is generally used. This is because the ester oil has high heat resistance as compared with mineral oils and a polar group which is contained in the molecular structure of the ester oil exhibits an activity of elevating the adsorption to the metal surface, whereby good abrasion property is ensured and the acoustic durability is improved. In the case where the reduction of fretting damage (abrasion) is required, use of a base oil having a relatively high viscosity and thereby exhibiting high oil film forming property is considered effective.

The saving of electric power and high speed rotation are being promoted also in the linear acting apparatuses such as linear guide apparatus and ball screw apparatus and a technique for attaining lower torque is considered important. Particularly, in the linear guide apparatus or ball screw apparatus required to satisfy high speed rotation and high torque output, the abrasion or torque increases accompanying the rising of output torque or rotational speed and this causes heat generation or motor load which obstructs the electric power saving and high speed rotation. Furthermore, the abrasion accompanying the rising of rotational speed gives rise to ball flaking.

Similarly to the above-described dynamical friction torque of rolling bearing, the torque of linear acting apparatuses is generated by the abrasion resulting from microscopic sliding on the rolling contact surface, the abrasion at the sliding contact part, the viscous resistance of grease or the like. Among these, the viscous resistance of grease is dependent on the kinematic viscosity of base oil in the grease and on the penetration of grease. Therefore, reduction in the kinematic viscosity of base oil and the increase in penetration are effective for the reduction of torque. However, if the kinematic viscosity of base oil is lowered, the thickness of oil film on the lubricating surface decreases and this sometimes adversely affects the lubricating performance. On the other hand, if the penetration is elevated, the content of the thickener in the grease relatively decreases and the resistance against mechanical shearing is diminished, as a result, the grease may be softened and leaked during operation or there arises a problem in the impact resistance.

From these reasons, a grease where the kinematic viscosity of base oil at 40° C. is from 10 to 500 mm²/s and the penetration is NLGI No. 2 to No. 3 grade, is conventionally packed in linear acting apparatuses.

Also, the torque may be effectively lowered by the reduction in the amount of grease packed, which allows, however, easy occurrence of abrasion or ball flaking due to lubrication failure.

As described above, higher performance and greater multifunction of air conditioners are required and as for the specification of ball bearing installed therein, more improvement in the acoustic property, reduction in the fretting damage (abrasion) and lower torque are demanded by taking account of the environmental regulation. These requirements increase highly probably in future. The same applies to linear acting apparatuses such as linear guide apparatus and ball screw apparatus.

SUMMARY OF THE INVENTION

The present invention has been made under these circumstances and the object of the present invention is to provide a grease composition capable of improving the bearing initial sound (cage sound) at the starting of operation in a low-temperature environment and at the same time, effective on the reduction of fretting damage (abrasion) and torque, and also provide a rolling apparatus having excellent low-temperature acoustic property and ensuring reduction in the fretting damage (abrasion) and in the torque.

For attaining the above-described object, the present invention provides a grease composition comprising a base oil having blended therewith a metallic soap-base thickener containing a long-fiber material having a major axis part length of at least 3 μm, the base oil being obtainable by mixing a lubricating oil having a polar group within the molecule structure and a non-polar lubricating oil. The present invention also provides a rolling bearing and a linear acting apparatus, in which the above-described grease composition is packed.

The grease composition of the present invention contains a long-fiber material having a major axis part length of 3 μm or more as a thickener and this long-fiber material exhibits orientation property due to shearing at the rotation and reduces the dynamic torque. This effect is more enhanced when combined with a non-polar lubricating oil contained in the base oil. Also, a lubricating oil having a polar group in the molecule structure (hereinafter referred to as "polar group-containing lubricating oil"), which is contained in the base oil, acts similarly to conventional base oils having a polar group (for example, ester oil) and preferentially adsorbs to the rotation contact surface to form an adsorption film and thereby improve friction property and acoustic property. Furthermore, the polar group of this polar group-containing lubricating oil interacts with the micell structure of metallic soap, thereby weakening particularly the bonding strength of long-fiber materials with each other in the thickener, diminishing the shearing resistance of grease at the rotation and more reducing the dynamic torque.

Accordingly, the rolling apparatuses having packed therein the above-described grease composition, such as rolling bearing, linear guide apparatus and ball screw apparatus, all exhibit excellent acoustic property, reduced fretting damage (abrasion) and low torque.

BRIEF DESCRIPTION OF THE INVENTION

FIG. 1A is an electron microscope photograph of the grease composition obtained in Example 1.

FIG. 1B is an electron microscope photograph of the grease composition obtained in Comparative Example 5.

FIG. 2 is a partially cut perspective view showing one example of the rolling bearing as an object of the present invention.

FIG. 3 is a perspective view showing another example of a cage integrated into a rolling bearing.

FIG. 4 is a cross-sectional view showing one example of the ball screw apparatus as an object of the present invention.

FIG. 5 is a view schematically showing a construction of the measuring apparatus used for performing a bearing torque test in Example.

FIG. 6 is a graph showing the relationship between the ratio of the polar group-containing lubricating oil blended and the bearing torque, obtained in Example.

FIG. 7 is a graph showing the relationship between the kinematic viscosity of base oil and the bearing torque, obtained in Example or Comparative Example.

FIG. 8 is a graph showing the relationship between the ratio of long-fiber material blended in the thickener and the bearing torque, obtained in Example.

Figure 9:
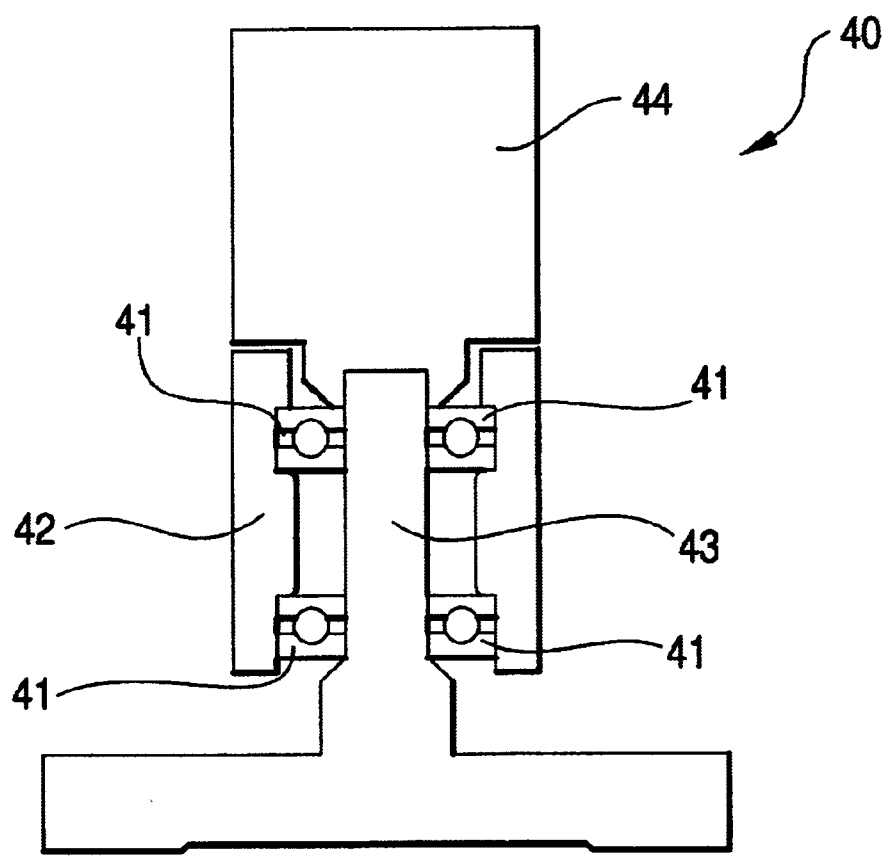
FIG. 9 is a view schematically showing a construction of the measuring apparatus used for performing a fretting test in Example.

| Description of Reference Numerals: | |
|---|---|
| 1 | inner raceway |
| 2 | inner ring |
| 3 | outer raceway |
| 4 | outer ring |
| 5 | ball |
| 6 | cage |
| 7 | pocket |
| 8 | element |
| 9 | concave |
| 10 | rivet |
| 11 | cage |
| 12 | main part |
| 13 | elastic piece |
| 14 | concave |
| 30 | measuring apparatus for torque test |
| 31 | test bearing |
| 32 | air spindle |
| 33 | shaft |
| 34 | wave washer for pre-load |
| 35 | thread |
| 36 | load converter |
| 37 | X-Y recorder |
| 40 | measuring apparatus for fretting test |
| 41 | test bearing |
| 42 | housing |
| 43 | shaft |
| 44 | vibrator |
| 50 | ball screw shaft |
| 52 | ball screw groove |
| 60 | ball nut |
| 64 | ball screw groove |
| 70 | ball |
| 80 | ball circulating tube |

DETAILED DESCRIPTION OF THE INVENTION

The present invention is described in detail below by referring to the drawings.

(Grease Composition)

The base oil constituting the grease composition of the present invention is a mixed oil of a polar group-containing lubricating oil and a non-polar lubricating oil. The polar group-containing lubricating oil is preferably a lubricating oil having an ester structure or a lubricating oil having an ether structure.

The lubricating oil having an ester structure is not particularly limited, however, preferred examples thereof include diester oils obtained by a reaction between a dibasic acid and a branched alcohol, carbonic acid ester oils, aromatic ester oils obtained by a reaction between an aromatic tribasic acid and a branched alcohol, and polyol ester oils obtained by a reaction between a monobasic acid and a polyhydric alcohol. These may be used individually or in combination of a plurality of them. Specific preferred examples of each oil are exemplified below.

Examples of the diester oil include dioctyl adipate (DOA), diisobutyl adipate (DIBA), dibutyl adipate (DBA), dioctyl azelate (DOZ), dibutyl sebacate (DBS), dioctyl sebacate (DOS) and methyl·acetyl ricinolate (MAR-N).

Examples of the aromatic ester include trioctyl trimellitate (TOTM), tridecyl trimellitate and tetraoctyl pyromellitate.

Examples of the polyol ester oil include polyol ester oils obtained by appropriately reacting a polyhydric alcohol described below with a monobasic acid. As for the monobasic acid reacted with the polyhydric alcohol, a sole monobasic acid may be used or a plurality of monobasic acids may be used. Furthermore, the ester may be a complex ester which is an oligoester of a polyhydric alcohol with a mixed fatty acid of a dibasic acid and a monobasic acid. Examples of the polyhydric alcohol include trimethylolpropane (TMP), pentaerythritol (PE), dipentaerythritol (DPE), neopentyl glycol (NPG) and 2-methyl-2-propyl-1,3-propanediol (MPPD). For the monobasic acid, a $C_4$ to $C_{16}$ monovalent fatty acid is mainly used and specific examples thereof include butyric acid, valeric acid, caproic acid, caprylic acid, enanthic acid, pelargonic acid, capric acid, undecanoic acid, lauric acid, myristic acid, palmitic acid, beef tallow fatty acid, stearic acid, caproleic acid, palmitoleic acid, petroselinic acid, oleic acid, elaidic acid, asclepinic acid, vaccenic acid, sorbic acid, linoleic acid, linolenic acid, sabinic acid, and ricinoleic acid.

Examples of the carboxylic acid oil include those with a $C_6$ to $C_{30}$ linear or branched alkyl group.

Examples of the lubricating oil having an ether structure include (di)alkyl diphenyl ether oil, (di)alkyl polyphenyl ether oil and polyalkylene glycol oil.

The above-described polar group-containing lubricating oils may be used individually or in combination of a plurality of them. Among these, in view of the torque property and the acoustic durability, polyol ester oils and aromatic ester oils are preferred.

The non-polar lubricating oil which can be used includes a mineral oil, a synthetic hydrocarbon oil and a mixed oil thereof. Specific examples of the mineral oil include paraffin-base mineral oils and naphthene-base mineral oils. Specific examples of the synthetic hydrocarbon oil include poly-α-olefin oils. Among these, synthetic hydrocarbon oils are preferred in view of the acoustic durability.

The polar group-containing lubricating oil and the non-polar lubricating oil are preferably blended such that the polar group-containing lubricating oil occupies from 5 to 70% by mass, more preferably from 10 to 70% by mass, of the total amount of base oil. If the amount of polar group-containing lubricating oil blended is less than 5% by mass, a sufficiently high effect cannot be obtained on the acoustic durability and the reduction of torque. In the preparation of the grease composition for use in the rolling bearing of the present invention, a metallic soap-base thickener containing a long-fiber material is previously synthesized in a non-polar lubricating oil, dissolved and formed into a gel form and this gel form and a polar group-containing lubricating oil are mixed. Accordingly, if the amount of the polar group-containing lubricating oil blended exceeds 70% by mass, the amount of the non-polar lubricating oil becomes excessively small and this adversely affects the synthesis of the long-fiber metallic soap-base thickener. The numeral expressed with the unit "% by mass" as used herein is almost the same as the numeral expressed with the unit "% by weight".

The kinematic viscosity of the basic oil obtained by mixing a polar group-containing lubricating oil and a non-polar lubricating oil may be in the range from 10 to 500 mm²/s (40° C.) as in conventional techniques, however, from the standpoint of smoothly performing the above-described production, a high-viscosity polar group-containing lubricating oil having a kinematic viscosity at 40° C. of 2,000 to 100,000 mm²/s is preferably contained.

More preferably, a low-viscosity polar group-containing lubricating oil having a kinematic viscosity at 40° C. of 10 mm²/s to less than 150 mm²/s, a medium-viscosity polar group-containing lubricating oil having a kinematic viscosity at 40° C. of 150 mm²/s to less than 2,000 mm²/s and a high-viscosity polar group-containing lubricating oil having a kinematic viscosity at 40° C. of 2,000 to 100,000 mm²/s are used by appropriately combining these. In particular, three kinds oils of a low-viscosity polar group-containing lubricating oil, a medium-viscosity polar group-containing lubricating oil and a high-viscosity polar group-containing lubricating oil are preferably used as a mixture. At this time, the content of the high-viscosity polar group-containing lubricating oil is preferably set to 5 to 30% by mass based on the total amount of base oil. The low-viscosity polar group-containing lubricating oil is preferably at least one of oils selected from polyol ester oils, ether oils and diester oils.

The thickener constituting the grease composition for use in the rolling bearing of the present invention is a metallic soap containing a long-fiber material having a major axis part of at least 3 μm. As for the kind of the metallic soap, an organic fatty acid metal salt and an organic hydroxy fatty acid metal salt are particularly preferred, which are obtained by synthesizing a monovalent organic fatty acid and/or a divalent organic fatty acid or an organic hydroxy fatty acid with a metal hydroxide. The organic fatty acid is not particularly limited, however, examples thereof include lauric acid ($C_{12}$), myristic acid ($C_{14}$), palmitic acid ($C_{16}$), marganic acid ($C_{17}$), stearic acid ($C_{18}$), arachidic acid ($C_{20}$), behenic acid ($C_{22}$), lignoceric acid ($C_{24}$) and beef tallow fatty acid. Examples of the organic hydroxy fatty acid include 9-hydroxystearic acid, 10-hydroxystearic acid, 12-hydroxystearic acid, 9,10-dihydroxystearic acid, ricinolic acid and ricinoelaidic acid. Examples of the metal hydroxide include aluminum hydroxide, barium hydroxide, calcium hydroxide, lithium hydroxide and sodium hydroxide.

The combination of the organic fatty acid or organic hydroxy fatty acid with the metal hydroxide is not particularly limited, however, a combination of stearic acid, beef tallow fatty acid or hydroxy stearic acid (in particular, 12-hydroxystearic acid) with lithium hydroxide is preferred because of its excellent bearing performance. If desired, a plurality of species may also be used in combination.

The grease containing a metallic soap-base thickener including a long-fiber material may be obtained by reacting the above-described organic fatty acid or organic hydroxy fatty acid with the metal hydroxide in the non-polar lubricating oil as a base oil component and mixing the reaction product with the polar group-containing lubricating oil. The conditions in the production are not particularly limited, however, one example of the production process is described below.

A hydroxy stearic acid is dissolved in a synthetic hydrocarbon oil (non-polar lubricating oil) and reacted with a lithium hydroxide to produce a lithium soap. The obtained lithium soap is heated to 210° C. or more and dissolved in a polar group-containing lubricating oil. The resulting oil is once kept at 200° C. for about 60 minutes and thereafter, slowly cooled to 140° C. at a rate of 1° C./minute. When lowered to 140° C. or less, an additional base oil (synthetic hydrocarbon oil+polar group-containing lubricating oil) heated to 140° C. is added and the mixture is passed through a three-high roll mill, whereby the objective grease containing a long-fiber lithium soap can be obtained.

The amount of the thickener may be from 5 to 20% by mass as in conventional grease compositions and the amounts of the organic fatty acid or organic hydroxy fatty acid and the metal hydroxide blended are appropriately selected.

A long-fiber metallic soap-base thickener is contained in the grease composition and this long-fiber metallic soap-base thickener preferably occupies 30% by mass or more of the total amount of the thickener. If the content thereof is less than 30% by mass, a sufficiently high effect cannot be obtained on the reduction of bearing torque. Also, if the major axis part of the long-fiber metallic soap-base thickener is too long, a great vibration is generated when the long-fiber metallic soap-base thickener enters into the contact surface of the rolling bearing during the rotation, and this adversely affects particularly the initial acoustic property. Therefore, the upper limit length of the major axis part is preferably 10 µm. Although the minor axis part is not particularly limited, the length thereof is less than 1 µm. The dimensions of the major and minor axis parts of the long-fiber metallic soap-base thickener can be controlled by appropriately selecting the above-described reaction conditions.

The major and minor axis parts of the metallic soap-base thickener in the grease composition synthesized as above can be measured as follows. For example, the grease composition is dispersed in and thereby diluted with a solvent such as hexane, attached to a copper-made mesh having spread thereon a collodion film and observed through a transmission electron microscope at a magnification on the order of 6,000 to 20,000 times. FIG. 1A shows one example of the microphotograph (the grease composition of Example 1) and reveals that a long-fiber material having a major axis part of 3 µm or more is produced.

The worked penetration of the grease is preferably from 250 to 330.

In addition to the above-described base oil and thickener, the grease composition may contain an antioxidant, a rust preventive, a metal deactivator, an oiliness agent, an extreme pressure agent, a wear inhibitor, a viscosity index improver and the like insofar as the preferred properties of the grease composition are not impaired. These additives may be used individually or in combination of two or more thereof and these additives all may be a known compound. Examples of the antioxidant which can be used include amine-containing, phenol-containing and sulfur-containing antioxidants and zinc dithiophosphate. Examples of the rust preventive which can be used include petroleum sulfonate, dinonylnaphthalene sulfonate and sorbitan esters. Examples of the metal deactivator which can be used include benzotriazole and sodium zincate. Examples of the oiliness agent which can be used include fatty acids and vegetable oils. Examples of the viscosity index improver which can be used include polymethacrylate, polyisobutylene and polystyrene. These additives may be used either individually or in combination of two or more thereof and the amount added thereof as a whole is preferably 20% by mass or less based on the total amount of the grease composition.

The present invention also provides a rolling apparatus having packed therein the above-described grease composition. Examples of the rolling apparatus include a rolling bearing and a ball screw apparatus which are described below.

(Rolling Bearing)

In the present invention, the structure itself of the rolling bearing is not limited and examples thereof include the rolling bearing shown in FIG. 2. In the figure, the rolling bearing comprises an inner ring 2 having on the outer circumferential surface thereof an inner raceway 1, an outer ring 4 having on the inner circumferential surface thereof an outer raceway 3, which are concentrically disposed, and a plurality of balls 5,5 as rolling elements rotatably provided between the inner raceway 1 and the outer raceway 3. The inner raceway 1 and the outer raceway 3 both are a deep groove-type raceway and the balls 5,5 are rotatably held in the pockets 7,7 within a cage 6.

The cage 6 is called a ribbon cage (corrugated press cage) produced by combining a pair of elements 8,8 obtained by the press formation of a steel plate into a corrugated and annulus ring form. In each of these two elements 8,8, nearly semicylindrical concave indentations 9,9 for constructing respective pockets 7,7 are formed at a plurality of places in the circumference direction. These paired elements 8,8 are abutted with each other at the portions departed from the concave indentations 9,9 and those portions each is bound and fixed with a plurality of rivets 10, thereby completing an annulus ring-like cage 6 having pockets 7,7 at a plurality of places in the circumference direction. The middle part on the inner surface of each concave indentation 9,9 forms a spherical concave surface of giving a circular arc-like cross section, where the radius of curvature is slightly larger than the radius of curvature on the rolling surface of each ball 5,5.

As shown in FIG. 3, a cage 11 called a crown-type cage can also be used. This cage 11 has pockets 7,7 for rotatably holding respective balls 5,5 at a plurality of places in the circumference direction of an annulus ring-like main body 12 made of a synthetic resin or the like. Examples of the synthetic resin which can be used include polyamide resin, polyacetal resin, phenol resin, polypropylene resin and polyphenyl sulfide resin. To this resin, a reinforcing agent such as glass fiber may be added in an appropriate amount. Each pocket 7,7 is constructed by one side surface of paired elastic pieces 13,13 disposed with a spacing from each other on the main body 12, and a spherical concave surface 14,14 defined by one side surface (right surface in FIG. 3) in the axial direction (crosswise direction in FIG. 3) of the main body 12 and provided between the paired elastic pieces 13,13. The radii of curvature on the one side surface of the elastic pieces 13,13 and on the concave surface 14,14 each is slightly larger than the radius of curvatures on the rolling surface of the ball 5.

Whichever cage 6 or cage 11 is used, the grease composition of the present invention is filled in the space portion existing between the outer circumferential surface of the inner ring 2 and the inner circumferential surface of the outer ring 4 so as to allow the relative rotation between the inner ring 2 and the outer ring 4 to smoothly proceed. Furthermore, the rolling bearing is made free of vibration or noise and troubles such as seisure are prevented. For this purpose, an annulus ring-like seal plate (not shown) such as seal plate and shield plate is provided on the inner circumferential surface at both end parts of the outer ring 4 to block both end openings of the above-described space portion and thereby prevent the leakage of lubricant from this space portion or the invasion of foreign matters such as dust into this space portion. On the surfaces of the inner ring 2, the outer ring 4, the balls 5,5 and each cage 6,11, a lubricating oil is thinly coated by taking account of rust prevention or life elongation of metal-made members.

(Ball Screw Apparatus)

In the present invention, the structure itself of the ball screw apparatus is not limited and examples thereof include the ball screw apparatus shown in FIG. 4. In the figure, the ball screw apparatus comprises a ball screw shaft (guide shaft) 50 having formed on the outer circumferential surface thereof a helical ball screw groove (ball rolling groove) 52, a ball nut (movable body) 60 having formed on the inner circumferential surface 62 thereof a helical ball screw groove (ball rolling groove) 64 opposing the ball screw groove 52 of the screw shaft 50, a plurality of balls 70 rotatably interposed in the helical ball rolling space between the ball screw groove 52 of the screw shaft 50 and the ball screw groove 64 of the ball nut 60, opposing each other, and a ball circulating tube (ball circulating member) 80 for circulating these balls 70.

The ball circulating tube 80 is formed of a tube having a nearly U-shaped outer form and its both ends 82 each is inserted into the ball rolling space inside the ball nut 60 from the tube fixing port 69 passing through the ball nut 60 in the radial direction and fixed on the outer surface of the ball nut 60 with a clamp 86. The ball 70 moving in the helical ball rolling space repeats a circulation of moving through the ball screw groove 52,64 in a plurality of turns, being sucked at one end 82 of the ball circulating tube 80, passing through the inside of the ball circulating tube 80 and returning to the ball rolling space inside the ball nut 60 from the other end 82.

In the opening at both ends of the ball nut 60, a circular concave 66 is formed and the inner circumferential surface of the disk-shaped seal member 68 fitted to the circular concave slidably comes into contact with the space between the outer circumferential surface of the ball screw shaft 50 and the ball screw groove 52, thereby sealing the inside of the ball screw apparatus. The grease composition of the present invention is packed in the ball rolling space.

According to the thus-constructed ball screw apparatus, the ball screw shaft 50 and the ball nut 60 are contacted through the rolling of the ball 70 and therefore, the ball nut 60 can perform a helical movement relatively to the ball screw shaft 50 with a small driving force.

The present invention is described in more detail below by referring to Examples and Comparative Examples, however, the present invention is not limited to the following Examples.

EXAMPLES 1 TO 5 AND COMPARATIVE EXAMPLES 1 TO 5

The grease compositions of Examples 1 to 5 and Comparative Examples 1 to 5 and properties thereof are shown in Tables 1 and 2. To lithium soap and base oil in a total amount of 950 g, an antioxidant, a rust preventive and a metal deactivator were added in a total amount of 50 g to prepare 1,000 g in total of a grease composition. The kinematic viscosity (40° C.) of each base oil (a mixed oil of polar group-containing lubricating oil and a non-polar lubricating oil) is shown together in Tables. As for the preparation method, a hydroxystearic acid was dissolved in each non-polar lubricating oil and reacted with lithium hydroxide to produce a lithium soap and the obtained lithium soap was heated to 210° C. or more, dissolved in each polar group-containing lubricating oil and after once kept at 200° C. for about 60 minutes, cooled to 140° C. at a rate of 1° C./minute. At the time when the temperature reached 140° C. or less, an additional base oil (synthetic hydrocarbon oil+ polar group-containing lubricating oil) heated to 140° C. was added and passed through a 3-stage roll mill to obtain a grease composition.

The grease compositions of Example 1 and Comparative Examples 5 each was dispersed in and thereby diluted with hexane, attached to a copper-made mesh having spread thereon a collodion film and observed through a transmission electron microscope at a magnification of 6,000 times. FIG. 1A and FIG. 1B show the grease compositions of Example 1 and Comparative Example 5, respectively. It is seen that the grease composition of Example 1 contains lithium soap having a major axis part of 3 μm or more.

Each grease composition was packed to a test bearing and subjected to (1) a bearing dynamic torque test, (2) a bearing cage sound measurement and (3) a fretting test.

(1) Bearing Dynamic Torque Test

Using the measuring apparatus 30 shown in FIG. 5, the measurement of bearing dynamic torque was performed. In this measuring apparatus 30, two test bearings 31 forming one set are mounted on the shaft 33 connected to an air spindle 32 using a wave washer 34 for pre-load. The test bearing 31 is horizontally disposed similarly to the air spindle 32, a load converter 36 is suspended through a thread 35, and the output of the load converter 36 is recorded by the X-Y recorder 37.

The test bearing 31 used in the test is a rolling bearing with a non-contact rubber seal having an inside diameter of 15 mmφ, an outside diameter of 35 mmφ and a width of 11 mm and equipped with an iron cage. To this rolling bearing, 0.7 g of each grease composition of Examples 1 to 5 and Comparative Examples 1 to 5 was packed and the dynamic torque was measured by rotating the inner ring at 1,400 rpm with an axial load of 39.2 N. The measurement results are shown as Dynamic torque in Tables 1 and 2. In Tables 1 and 2, assuming that the dynamic torque of rolling bearing having packed therein a grease composition conventionally used for air-conditioner fan motors is 100% (reference value), the mark × indicates that the dynamic torque of the test bearing 31 is 90% or more, the mark Δ indicates from 70% to less than 90% of the reference value, the mark ○ indicates from 50% to less than 70% of the reference value and the mark ⊙ indicates less than 40% of the reference value. In the bearing dynamic torque test, the mark ○, that is, the case where the dynamic torque is less than 70% of the reference value was judged acceptable. As seen from Tables 1 and 2, good torque property is obtained in Examples 1 to 5.

The blended ratio of the polar group-containing lubricating oil in the grease composition, the kinematic viscosity of base oil and the blended ratio of long-fiber material in the thickener were verified from the measurement of the bearing dynamic torque.

(1-1: Verification of Blended Ratio of Polar Group-Containing Lubricating Oil)

According to Example 2, a grease compositions was prepared by changing the blended ratio of polyol ester and subjected to the above-described measurement of bearing dynamic torque. The measurement was performed after the passing of 5 minutes from the start of rotation. The results obtained are shown in FIG. 6. It is seen that by blending polyol ester in an amount of 5% by mass or more, particularly, 10% by mass or more, very excellent torque property can be obtained.

(1-2: Verification of Kinematic Viscosity of Base Oil)

According to Example 2 and Comparative Example 4, grease compositions were prepared by changing the kinematic viscosity of base oil and subjected to the above-described measurement of bearing dynamic torque. The measurement was performed after the passing of 5 minutes from the start of rotation. The results obtained are shown in FIG. 7. It is seen that in the test bearing to which the grease composition of Example 2 is applied, the bearing dynamic torque is uniformly low in the whole range of the selected kinematic viscosity (from 50 to 200 mm$^2$/s, 40° C.) of base oil and very excellent torque property can be obtained.

(1-3: Verification of Blended Ratio of Long-Fiber Material in Thickener)

According to Example 2, a grease composition was prepared by changing the blended ratio of long-fiber material in lithium soap and subjected to the above-described measurement of bearing torque. The measurement was performed after the passing of 5 minutes from the start of rotation. The results obtained are shown in FIG. 8 and it is seen that when the blended ratio of long-fiber material is 30% by mass or more, the bearing torque can be suppressed low.

(2) Measurement of Bearing Cage Sound

The test bearing 31 used in the test is a rolling bearing with a non-contact rubber seal having an inside diameter of 15 mmφ, an outside diameter of 35 mmφ and a width of 11 mm and equipped with an iron cage. To this rolling bearing, 0.7 g of each grease composition of Examples 1 to 5 and Comparative Examples 1 to 5 was packed and the cage sound at 0° C. and 20° C. was measured using a frequency analyzer by rotating the inner ring at 1,400 rpm with an axial load of 39.2 N. The measurement results are shown as Cage Sound in Tables 1 and 2. In Tables 1 and 2, the mark ○ indicates no generation of cage sound, the mark Δ indicates that cage sound is slightly generated, and the mark × indicates generation of large cage sound. It is seen from Tables 1 and 2 that cage sound at low temperatures is not generated in Examples 1 to 5.

(3) Fretting Test

Using the measuring apparatus 40 shown in FIG. 9, a fretting test was performed. In the measuring apparatus 40, a test bearing 41 is fixed with a housing 42 and a shaft 43. A repeated load with a frequency of 50 Hz was applied to act on the test bearing 41 using a vibrator 44. The test bearing 41 used in the test is a rolling bearing with a non-contact rubber seal having an inside diameter of 15 mmφ, an outside diameter of 35 mmφ and a width of 11 mm and equipped with an iron cage. Thereto, 0.7 g of each grease composition of Examples 1 to 5 and Comparative Examples 1 to 5 was packed and a fretting test was performed by changing the axial load in the range from 20 to 1500 N and repeated 5×10$^5$ times. The test bearing 41 after the test was examined on the acoustic property of the bearing according to the following criteria.

The acoustic property of bearing was examined using an Anderon meter and judged based on the increase in the Anderon's value by comparing the Anderon's value of bearing immediately after the packing of each grease composition with the Anderon's value of bearing after the fretting test repeated 5×10$^5$ times. The test bearing after the fretting test was disassembled and the abrasion damage state on the bearing raceway surface was observed. As a result, it is confirmed that the bearing having a deep and clearly observable abrasion trace undergoes great reduction in the acoustic property (large increase in the Anderon's value), whereas the bearing having scarcely observable abrasion trace is free of reduction in the acoustic property (no increase in the Anderon's value). This reveals that the abrasion damage state on the bearing raceway surface is correlated with the acoustic property.

The judgment results are shown as Fretting (acoustic property) in Tables 1 and 2. In Tables 1 and 2, assuming that the acoustic property (increase in the Anderon's value) of rolling bearing having packed therein a grease composition conventionally used for air-conditioner fan motors is 100%, the mark × indicates that the acoustic property of the test bearing 41 is 85% or more, the mark Δ indicates from 60% to less than 85% of the reference value, the mark ○ indicates from 35% to less than 60% of the reference value and the mark ⊙ indicates less than 35%. In the fretting test, the mark ○, that is, the case where the acoustic property is less than 60% of the reference value was judged acceptable. As seen from Tables 1 and 2, good fretting property is obtained with the grease composition of Examples 1 to 5.

TABLE 1

| Composition · Property | | Example 1 | Example 2 | Example 3 | Example 4 | Example 5 |
|---|---|---|---|---|---|---|
| Thickener · lithium soap (g) | | 100 | 120 | 100 | 120 | 80 |
| Base oil | poly-α-olefin oil (g) | 340 | 498 | 637 | 498 | 348 |
| | mineral oil (g) | | | | | |
| | polyol ester oil (g) | 510 | 332 | 213 | 166 | 330 |
| | alkyldiphenyl ether oil (g) | | | | 166 | 330 |
| Additives (g) | | 50 | 50 | 50 | 50 | 50 |
| Kinematic viscosity of base oil (mm$^2$/s, 40° C.) | | 170 | 100 | 50 | 150 | 200 |
| Worked penetration | | 280 | 270 | 290 | 270 | 280 |
| Fiber structure | | containing long-fiber material | containing long-fiber material | containing long-fiber material | containing long-fiber material | containing long-fiber material |
| Dynamic torque | | ⊙ | ⊙ | ⊙ | ⊙ | ○ |
| Cage sound | 20° C. | ○ | ○ | ○ | ○ | ○ |
| | 0° C. | ○ | ○ | ○ | ○ | ○ |
| Fretting (acoustic property) | | ⊙ | ⊙ | ○ | ⊙ | ⊙ |

TABLE 2

| Composition · Property | | Comparative Example 1 | Comparative Example 2 | Comparative Example 3 | Comparative Example 4 | Comparative Example 5 |
|---|---|---|---|---|---|---|
| Thickener · lithium soap (g) | | 120 | 130 | 100 | 120 | 120 |
| Base oil | poly-α-olefin oil (g) | | 498 | | 830 | |
| | mineral oil (g) | | | 850 | | |
| | polyol ester oil (g) | 830 | 332 | | | 830 |
| | alkyldiphenyl ether oil (g) | | | | | |
| Additives (g) | | 50 | 50 | 50 | 50 | 50 |
| Kinematic viscosity of base oil (mm²/s, 40° C.) | | 25 | 55 | 130 | 100 | 117 |
| Worked penetration | | 250 | 235 | 270 | 277 | 276 |
| Fiber structure | | only short-fiber material | only short-fiber material | containing long-fiber material | containing long-fiber material | only short-fiber material |
| Dynamic torque | | ⊚ | ⊚ | X | Δ | X |
| Cage sound | 20° C. | ○ | ○ | ○ | Δ | Δ |
| | 0° C. | ○ | Δ | Δ | Δ | X |
| Fretting (acoustic property) | | X | X | Δ | Δ | Δ |

EXAMPLES 6 TO 25 AND COMPARATIVE EXAMPLES 6 TO 15

In accordance with Examples 1 to 5 and Comparative Examples 1 to 5, grease compositions were prepared using the blending shown in Tables 3 to 8. The kinematic viscosity of Poly-α-olefin Oil A used is 33 mm²/s (40° C.), kinematic viscosity of Poly-α-olefin Oil B is 60 mm²/s (40° C.), the kinematic viscosity of Poly-α-olefin Oil C is 100 mm²/s (40° C.), the kinematic viscosity of mineral oil is 130 mm²/s (40° C.), the viscosity of diester oil is 12 mm²/s (40° C.), the kinematic viscosity of Polyol Ester Oil C is 760 mm²/s (100° C.), the kinematic viscosity of Polyol Ester Oil D is 33 mm²/s (40° C.), the kinematic viscosity of Polyol Ester Oil E is 200 mm²/s (40° C.), the kinematic viscosity of Alkyldiphenyl Ether Oil A is 100 mm²/s (40° C.) and the kinematic viscosity of Alkyldiphenyl Ether Oil B is 67 mm²/s (40° C). Polyol Ester Oil A and Polyol Ester Oil B used were different in the kinematic viscosity. The kinematic viscosity (40° C.) of each base oil (a mixed oil of polar group-containing lubricating oil and non-polar lubricating oil) are shown together in Tables.

Using each grease composition, the above-described (1) bearing dynamic torque test, (2) measurement of bearing sound and (3) fretting test were performed. The results obtained are also shown together in Tables 3 to 8 according to the similar judgment criteria. The results of the bearing dynamic torque test is shown as Dynamic torque (rolling bearing). The results in each test reveal that Examples are superior to Comparative Examples.

Figure 10A:
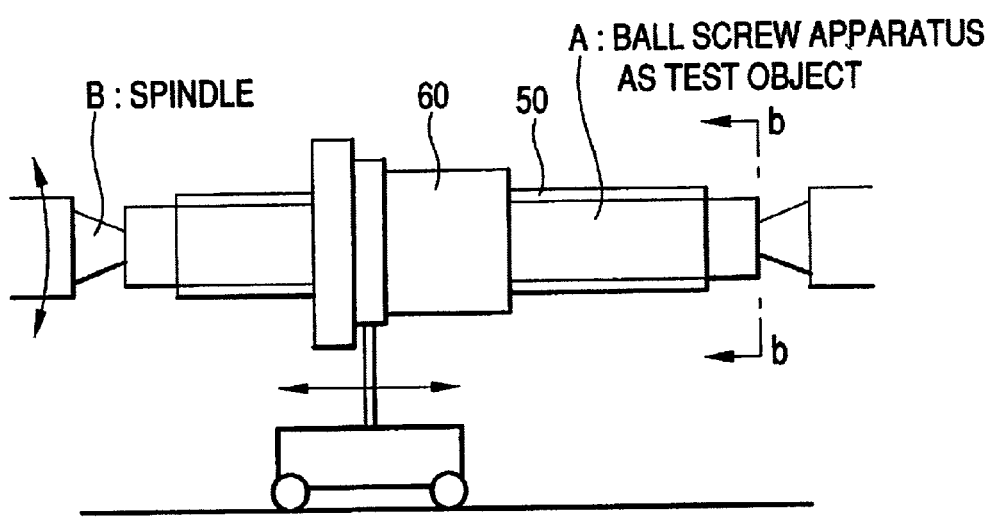
FIG. 10A is a view schematically showing a construction of the measuring apparatus used for measuring the dynamic torque of ball screw apparatus in Example.
Figure 10B:
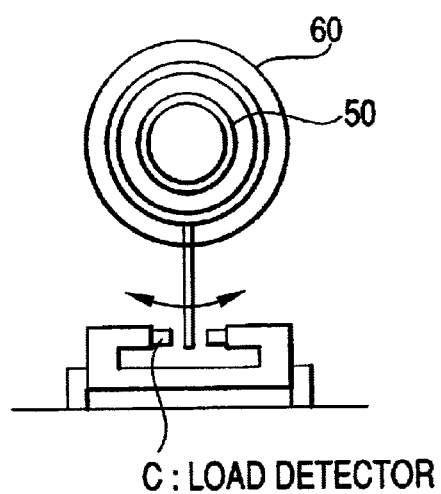
FIG. 10B is a view showing the arrow b—b part in FIG. 10A.

Also, using a ball screw apparatus (diameter of ball screw shaft 50: 25 mm, lead: 20 mm) shown in FIG. 4 as a test object, the torque was measured by packing 5 ml of each grease composition into the ball nut 60. The torque was measured using the measuring apparatus shown in FIGS. 10A and 10B. The measuring apparatus shown has a construction such that the ball screw shaft 50 of the ball screw apparatus A as a test object is rotated at 500 rpm by a spindle B and the dynamic torque value measured using a load detector C is recorded on a recorder.

The measurement results are shown as Dynamic torque (linear acting apparatus) in Tables 3 to 8. In Tables 3 to Table 8, assuming that the dynamic torque of ball screw apparatus having packed therein a grease composition conventionally used is 100% (reference value), the mark × indicates that the dynamic torque of the test object is 90% or more, the mark Δ indicates from 70% to less than 90% of the reference value, the mark ○ indicates from 50% to less than 70% of the reference value and the mark ⊚ indicates less than 40% of the reference value. The mark ○, that is, the case where the dynamic torque is less than 70% of the reference value was judged acceptable. As seen from Tables 3 to 8, good torque property is obtained in all Examples.

Using the same test object, the ball flaking durability was evaluated. More specifically, the test object was run 3,000 km (corresponding to 8,500 hours) under a load of 2.5 kN with an accelerometer of 1.5 G at a rotation number of 3,000 rpm and then disassembled and the surface of the ball was observed with an eye. The results are shown as Ball Flaking Durability in Tables 3 to 8. In Tables 3 to 8, the mark × indicates that the surface of ball is seriously damaged and the ball flaking can be confirmed, the mark Δ indicates that the damage on the surface of ball can be confirmed, and the mark ○ indicates that the damage on the surface of ball cannot be confirmed or slight damage can be confirmed on the surface of ball. The mark ○ and the mark ○-Δ were judged acceptable. It is seen from Tables 3 to 8 that in any of Examples, ball flaking durability equal to or greater than that in Comparative Examples are attained. The content of high-viscosity polar group-containing lubricating oil in the base oil is about 5% by mass in Example 17, about 15% by mass in Example 19, about 20% by mass in Example 16 and about 27% by mass in Example 20, and in all of these Examples, good results are exhibited with respect to dynamic torque, fretting and ball flaking durability.

In any of Examples 1 to 25, the worked penetration of grease is 250 or more and this is as high as the upper limit of conventional NLGI No. 3. From this, it is seen that when the penetration is lifted to a relatively larger value than in conventional techniques, a low torque can be obtained. However, if the penetration is too large, the grease is excessively softened. Therefore, the penetration is preferably from 250 to 330.

TABLE 3

| Composition · Property | Example 6 | Example 7 | Example 8 | Example 9 | Example 10 |
|---|---|---|---|---|---|
| Thickener · lithium soap (g) | 100 | 120 | 100 | 120 | 80 |
| Base oil Poly-α-Olefin Oil A (g) | | | | | |
| Poly-α-Olefin Oil B (g) | 340 | 498 | 637 | 498 | 348 |
| mineral oil (g) | | | | | |
| diester oil (g) | | | | | |
| Polyol Ester Oil A (g) | 510 | 332 | 213 | 166 | 330 |
| Polyol Ester Oil B (g) | | | | | |
| Alkyldiphenyl Ether Oil A (g) | | | | | |
| Alkyldiphenyl Ether Oil B (g) | | | | 166 | 192 |
| Additives (g) | 50 | 50 | 50 | 50 | 50 |
| Kinematic viscosity of base oil (mm²/s, 40° C.) | 170 | 100 | 50 | 150 | 200 |
| Worked penetration | 280 | 270 | 290 | 270 | 280 |
| Fiber structure | containing long-fiber material | containing long-fiber material | containing long-fiber material | containing long-fiber material | containing long-fiber material |
| Dynamic torque (rolling bearing) | ◉ | ◉ | ◉ | ◉ | ○ |
| Cage 20° C. | ○ | ○ | ○ | ○ | ○ |
| sound 0° C. | ○ | ○ | ○ | ○ | ○ |
| Fretting (acoustic property) | ◉ | ◉ | ○ | ◉ | ◉ |
| Dynamic torque (linear acting apparatus) | ○ | ◉ | ◉ | ○ | ○ |
| Ball flaking durability | ○ | ○ | ○-Δ | ○ | ○ |

TABLE 4

| Composition · Property | Example 11 | Example 12 | Example 13 | Example 14 | Example 15 |
|---|---|---|---|---|---|
| Thickener · lithium soap (g) | 80 | 100 | 115 | 130 | 170 |
| Base oil Poly-α-Olefin Oil A (g) | | 340 | 260 | 620 | |
| Poly-α-Olefin Oil B (g) | 270 | | | | 330 |
| mineral oil (g) | | | | | |
| diester oil (g) | | | 125 | | |
| Polyol Ester Oil A (g) | 415 | 170 | 50 | 200 | 160 |
| Polyol Ester Oil B (g) | 185 | 340 | 400 | | |
| Alkyldiphenyl Ether Oil A (g) | | | | | 290 |
| Alkyldiphenyl Ether Oil B (g) | | | | | |
| Additives (g) | 50 | 50 | 50 | 50 | 50 |
| Kinematic viscosity of base oil (mm²/s, 40° C.) | 115 | 60 | 60 | 80 | 130 |
| Worked penetration | 300 | 285 | 270 | 250 | 290 |
| Fiber structure | containing long-fiber material | containing long-fiber material | containing long-fiber material | containing long-fiber material | containing long-fiber material |
| Dynamic torque (rolling bearing) | ◉ | ◉ | ◉ | ◉ | ◉ |
| Cage 20° C. | ○ | ○ | ○ | ○ | ○ |
| sound 0° C. | ○ | ○ | ○ | ○ | ○ |
| Fretting (acoustic property) | ◉ | ○ | ○ | ○ | ◉ |
| Dynamic torque (linear acting apparatus) | ◉ | ◉ | ◉ | ◉ | ◉ |
| Ball flaking durability | ○ | ○-Δ | ○-Δ | ○-Δ | ○ |

TABLE 5

| Composition · Property | Comparative Example 6 | Comparative Example 7 | Comparative Example 8 | Comparative Example 9 | Comparative Example 10 |
|---|---|---|---|---|---|
| Thickener · lithium soap (g) | 120 | 130 | 100 | 120 | 120 |
| Base oil Poly-α-Olefin Oil A (g) | | | | | |
| Poly-α-Olefin Oil B (g) | | 498 | | 830 | |
| mineral oil (g) | | | 850 | | |
| diester oil (g) | 830 | 322 | | | |
| Polyol Ester Oil A (g) | | | | | 830 |
| Polyol Ester Oil B (g) | | | | | |
| Alkyldiphenyl Ether Oil A (g) | | | | | |
| Alkyldiphenyl Ether Oil B (g) | | | | | |
| Additives (g) | 50 | 50 | 50 | 50 | 50 |
| Kinematic viscosity of base oil (mm²/s, 40° C.) | 25 | 55 | 130 | 100 | 117 |
| Worked penetration | 250 | 235 | 270 | 277 | 276 |
| Fiber structure | only short-fiber material | only short-fiber material | containing long-fiber material | containing long-fiber material | only short-fiber material |

TABLE 5-continued

| Composition · Property | Comparative Example 6 | Comparative Example 7 | Comparative Example 8 | Comparative Example 9 | Comparative Example 10 |
|---|---|---|---|---|---|
| Dynamic torque (rolling bearing) | ⊙ | ⊙ | X | ○-Δ | X |
| Cage 20° C. | ○ | ○ | ○ | Δ | Δ |
| sound 0° C. | ○ | Δ | Δ | Δ | X |
| Fretting (acoustic property) | X | X | Δ | Δ | Δ |
| Dynamic torque (linear acting apparatus) | ⊙ | ○ | X | Δ | X |
| Ball flaking durability | X | X | Δ | Δ | Δ |

TABLE 6

| Composition · Property | Example 16 | Example 17 | Example 18 | Example 19 | Example 20 |
|---|---|---|---|---|---|
| Thickener · lithium soap (g) | 100 | 120 | 100 | 120 | 80 |
| Base oil  Poly-α-Olefin Oil A (g) | | | | | |
| Poly-α-Olefin Oil B (g) | 340 | 498 | 636 | 498 | 348 |
| Poly-α-Olefin Oil C (g) | | | | | |
| mineral oil (g) | | | | | |
| diester oil (g) | | | | | |
| Polyol Ester Oil C (g) | 170 | 42 | 43 | 124 | 235 |
| Polyol Ester Oil D (g) | | | 171 | | |
| Polyol Ester Oil E (g) | 340 | 290 | | 42 | 95 |
| Alkyldiphenyl Ether Oil A (g) | | | | | |
| Alkyldiphenyl Ether Oil B (g) | | | | 166 | 192 |
| Additives (g) | 50 | 50 | 50 | 50 | 50 |
| Kinematic viscosity of base oil (mm²/s, 40° C.) | 170 | 100 | 50 | 150 | 200 |
| Worked penetration | 280 | 270 | 290 | 270 | 280 |
| Fiber structure | containing long-fiber material | containing long-fiber material | containing long-fiber material | containing long-fiber material | containing long-fiber material |
| Dynamic torque (rolling bearing) | ⊙ | ⊙ | ⊙ | ⊙ | ○ |
| Cage 20° C. | ○ | ○ | ○ | ○ | ○ |
| sound 0° C. | ○ | ○ | ○ | ○ | ○ |
| Fretting (acoustic property) | ⊙ | ⊙ | ○ | ⊙ | ⊙ |
| Dynamic torque (linear acting apparatus) | ○ | ⊙ | ⊙ | ○ | ○ |
| Ball flaking durability | ○ | ○ | ○-Δ | ○ | ○ |

TABLE 7

| Composition · Property | Example 21 | Example 22 | Example 23 | Example 24 | Example 25 |
|---|---|---|---|---|---|
| Thickener · lithium soap (g) | 80 | 100 | 115 | 130 | 170 |
| Base oil  Poly-α-Olefin Oil A (g) | | 340 | 260 | 620 | |
| Poly-α-Olefin Oil B (g) | | | | | 330 |
| Poly-α-Olefin Oil C (g) | | | | | |
| mineral oil (g) | | | | | |
| diester oil (g) | | | 125 | | |
| Polyol Ester Oil C (g) | 132 | 43 | 50 | 42 | 40 |
| Polyol Ester Oil D (g) | 218 | 340 | 400 | | |
| Polyol Ester Oil E (g) | 260 | 127 | | 158 | 120 |
| Alkyldiphenyl Ether Oil A (g) | | | | | 290 |
| Alkyldiphenyl Ether Oil B (g) | | | | | |
| Additives (g) | 50 | 50 | 50 | 50 | 50 |
| Kinematic viscosity of base oil (mm²/s, 40° C.) | 115 | 60 | 60 | 80 | 130 |
| Worked penetration | 300 | 285 | 270 | 250 | 290 |
| Fiber structure | containing long-fiber material | containing long-fiber material | containing long-fiber material | containing long-fiber material | containing long-fiber material |
| Dynamic torque (rolling bearing) | ⊙ | ⊙ | ⊙ | ⊙ | ⊙ |
| Cage 20° C. | ○ | ○ | ○ | ○ | ○ |
| sound 0° C. | ○ | ○ | ○ | ○ | ○ |
| Fretting (acoustic property) | ⊙ | ○ | ○ | ○ | ⊙ |
| Dynamic torque (linear acting apparatus) | ⊙ | ⊙ | ⊙ | ⊙ | ⊙ |
| Ball flaking durability | ○ | ○-Δ | ○-Δ | ○-Δ | ○ |

TABLE 8

| Composition · Property | | Comparative Example 11 | Comparative Example 12 | Comparative Example 13 | Comparative Example 14 | Comparative Example 15 |
|---|---|---|---|---|---|---|
| Thickener · lithium soap (g) | | 120 | 130 | 100 | 120 | 120 |
| Base oil | Poly-α-Olefin Oil A (g) | | | | | |
| | Poly-α-Olefin Oil B (g) | | 498 | | | |
| | Poly-α-Olefin Oil C (g) | | | | 830 | |
| | mineral oil (g) | | | 850 | | |
| | diester oil (g) | 750 | 322 | | | |
| | Polyol Ester Oil C (g) | | | | | 290 |
| | Polyol Ester Oil D (g) | | | | | 540 |
| | Polyol Ester Oil E (g) | 80 | | | | |
| | Alkyldiphenyl Ether Oil A (g) | | | | | |
| | Alkyldiphenyl Ether Oil B (g) | | | | | |
| Additives (g) | | 50 | 50 | 50 | 50 | 50 |
| Kinematic viscosity of base oil (mm²/s, 40° C.) | | 25 | 55 | 130 | 100 | 117 |
| Worked penetration | | 250 | 235 | 270 | 277 | 276 |
| Fiber structure | | only short-fiber material | only short-fiber material | containing long-fiber material | containing long-fiber material | only short-fiber material |
| Dynamic torque (rolling bearing) | | ◎ | ◎ | X | ○-Δ | X |
| Cage 20° C. | | ○ | ○ | ○ | Δ | Δ |
| sound 0° C. | | ○ | Δ | Δ | Δ | X |
| Fretting (acoustic property) | | X | X | Δ | Δ | Δ |
| Dynamic torque (linear acting apparatus) | | ◎ | ○ | X | Δ | X |
| Ball flaking durability | | X | X | Δ | Δ | Δ |

On comparison of Comparative Example 7 with Example 21 and Example 22, it is seen that the kinematic viscosity of base oil is 55 mm²/s (40° C.) and the found value of the bearing dynamic torque is 13×10⁻³ N·m in Comparative Example 7, the kinematic viscosity of base oil is 115 mm²/s (40° C.) and the found value of the bearing dynamic torque is 12×10⁻³ N·m in Example 21, and the kinematic viscosity of base oil is 60 mm²/s (40° C.) and the found value of the bearing dynamic torque is 10×10⁻³ N·m in Example 22. From the comparison between Comparative Example 7 and Example 22, it is seen that even if the kinematic viscosity of base oil is on the same level, the bearing dynamic torque can be reduced by about 20% when a long-fiber material is contained in the thickener. From the comparison between Comparative Example 7 and Example 21, it is seen that even if the bearing dynamic torque is on the same level, a base oil having a viscosity as high as about 2 times or more can be used by containing a long-fiber material in the thickener. As is also seen from the test results shown above, where the fretting and the ball flaking durability are inferior in Comparative Example 7 but good results are obtained in Example 21, a higher kinematic viscosity of base oil is advantageous for suppressing the fretting abrasion and the ball flaking. This reveals that by using a thickener containing a long-fiber material, the fretting or the ball flaking durability can be enhanced in addition to the low torque.

As is described in the foregoing pages, according to the present invention, a grease composition is provided, which improves the initial sound (cage sound) of bearing at the starting of operation in a low-temperature environment and is effective on the reduction of fretting damage (abrasion) or the reduction of torque. Furthermore, a rolling apparatus such as rolling bearing, linear guide apparatus and ball screw apparatus is provided, which exhibits excellent low-temperature acoustic property and is reduced in the fretting damage (abrasion) or the torque.

While the invention has been described in detail and with reference to specific embodiments thereof, it will be apparent to one skilled in the art that various changes and modifications can be made therein without departing from the spirit and scope thereof.

What is claimed is:

1. A grease composition comprising a base oil having blended therewith a metallic soap-base thickener, wherein the base oil comprises a mixture of polar group- containing lubricating oil and non-polar lubricating oil, the metallic soap-based thickener contains a long-fibrous metrallic soap having a major axis part length of from 3 to 10 μm, in the content of 30 % by mass or more based on the total amount of the metallic soap-based thickener, the base oil contains a low-viscosity polar group-containing lubricating oil having a kinematic viscosity at 40° C. of 10 mm²/s to less than 150 mm²/s, a medium-viscosity polar group-containing lubricating oil having a kinematic viscosity at 40° of 150 mm²/s to less than 2,000 mm²/s and a high-viscosity viscosity polar group-containing lubricating oil having a kinematic viscosity at 40° of 2,000 mm²/s to 1000,000 mm²/s, the base oil contains the high-viscosity polar group viscosity polar group-containing lubricating oil in the content of 5 to 30 % by mass based on the total amount of the base, and the base oil and base oil contains the polar group-containing lubricating oil, including the low-viscosity, meduium-viscosity and high-viscosity polar group-containing lubricating oils, in the content of not more than 70 % by mass based on the total amount of the base oil.

2. A rolling apparatus having packed therein the grease composition claimed in claim 1.

3. A rolling bearing having packed therein the grease composition claimed in claim 1.

4. A linear guide apparatus having packed therein the grease composition clain in claim 1.

5. A ball screw apparatus having packed therein the grease composition claimed in claim 1.

* * * * *